May 22, 1962  E. A. HENRY  3,036,231
HIGH RESOLUTION PIEZOELECTRIC TRANSDUCER
Filed July 24, 1958  2 Sheets-Sheet 1
FIG. IA.
WHEN FIELD IS APPLIED
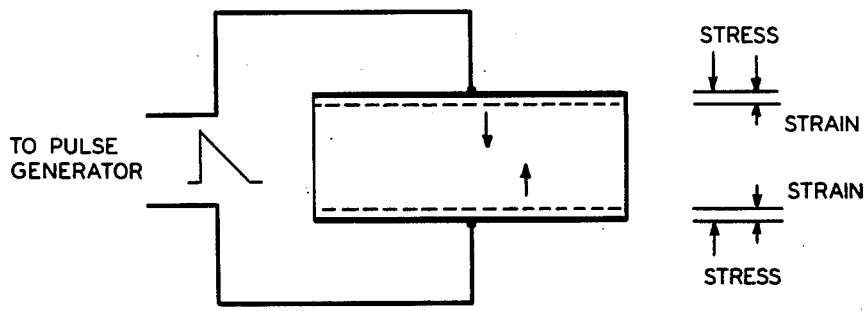
(INTERNAL ARROWS INDICATE DIRECTION OF STRESSES)
FIG. IB.
ONE-HALF CYCLE LATER
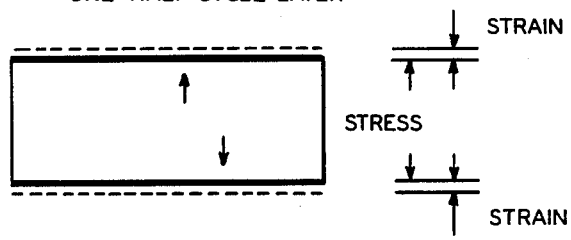

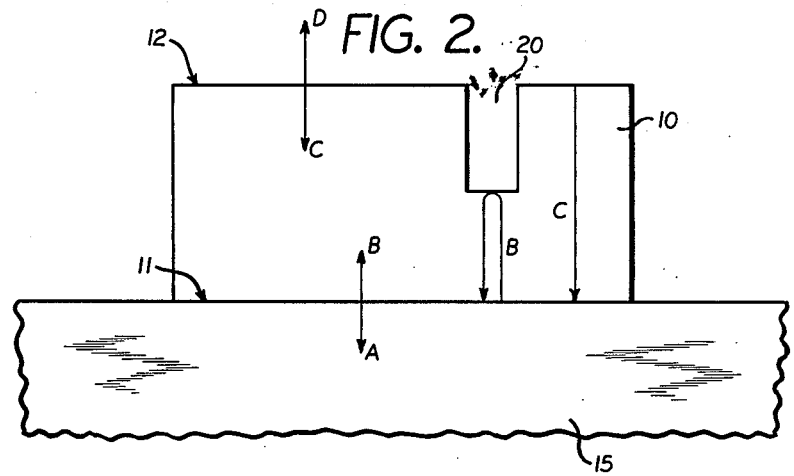
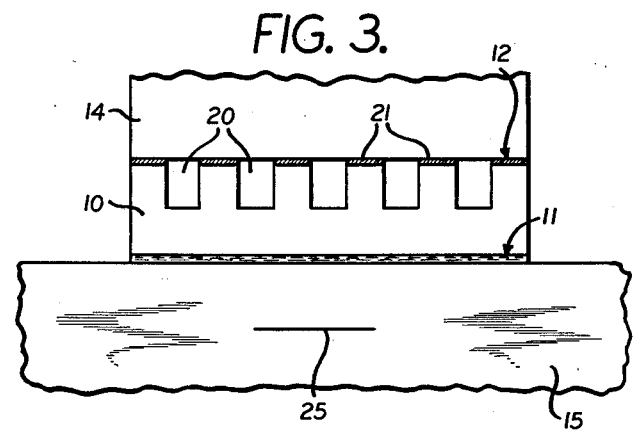
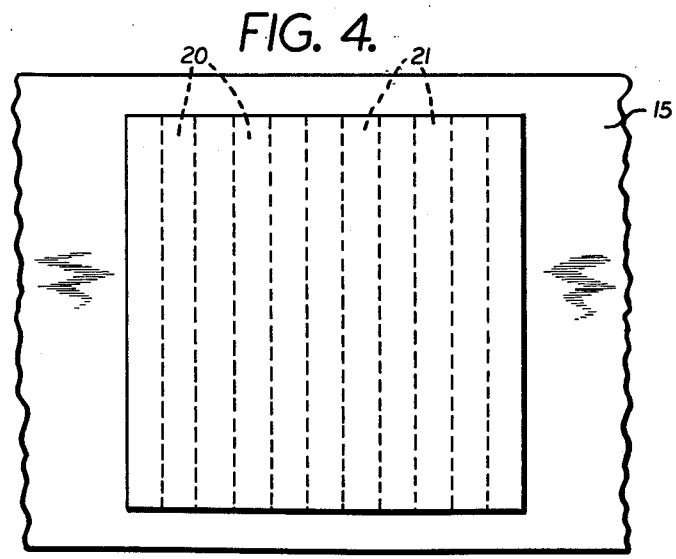

United States Patent Office 3,036,231
Patented May 22, 1962

3,036,231
HIGH RESOLUTION PIEZOELECTRIC TRANSDUCER
Elliott A. Henry, Newtown, Conn., assignor to Sperry Products, Inc., Danbury, Conn., a corporation of New York
Filed July 24, 1958, Ser. No. 750,686
6 Claims. (Cl. 310—9.7)

This invention relates to a method and means for constructing a high resolution piezoelectric transducer. Such resolution is limited in present types of transducers by reason of the fact that energy is developed in the transducer which is not transferred to the acoustic load or workpiece. Various methods have been proposed for overcoming this difficulty. These methods involve either one or a combination of two general techniques. These are: first, application of mechanical damping to dissipate the acoustic energy that is not transferred to the workpiece, and, second, the use of a piezoelectric element with irregular geometry usually in the form of non-parallel faces to prevent a major resonance in the thickness mode for any specific frequency. The first method has had limited success with piezoelectric elements having medium or low acoustic impedances, such as natural quartz and lithium sulphate, but little or no success with high acoustic impedance ferroelectric elements such as barium titanate or lead metaniobate. The second method has proved unsuitable for ultrasonic reflectoscope applications as the sensitivity is very low and a wide range of spurious frequencies (a function of the non-parallelism) are generated.

It is therefore the principal objective of this invention to provide a piezoelectric or ferroelectric acoustic transducer having high effective internal damping under all operating conditions, and which is free of the performance limitations of previous acoustic transducers. Such highly damped acoustic transducers are required in ultrasonic pulse echo ranging methods and apparatus, such as the Ultrasonic Reflectoscope disclosed by F. A. Firestone in U.S. Patent No. 2,280,226, granted April 21, 1942, as the resolution of the transducer controls both the resolution and minimum test range of the instrument. The shorter the acoustic wave train, the greater the resolution and the closer to the entrant surface defects may be detected. It then follows that the shortest acoustic wave train, or pulse, will be generated when the transducer is excited by a non-cyclic electric field, preferably of the types known as "Step-wave" and "Ramp-wave," such as shown in my U.S. Patent No. 2,842,959, granted July 15, 1958, and where the acoustic energy, generated by the electric field and not transferred to the test specimen, is dissipated in the shortest time. It is the stored mechanical (acoustic) energy in the crystal, echoing back and forth between the crystal faces until dissipated either by internal losses or partial loss to each face load, that is responsible for the long acoustic wave trains generated and the low resolution of transducers.

The method herein described and employed in this invention provides a high resolution acoustic transducer by arranging a physical geometry for the crystal such that self-cancellation of the internal reflections of the residual acoustic energy will result when the crystal is employed as a generator of acoustic waves, and self-cancellation of the electric fields generated by the internal reflections will result when employed as a detector of acoustic waves.

Further objects and advantages of this invention will become apparent in the following detailed description thereof.

In the accompanying drawings,

FIGS. 1A and 1B are front elevations of a piezoelectric element illustrating diagrammatically the theory underlying this invention.

FIG. 2 is a front elevation of a piezoelectric transducer applied to a workpiece and showing diagrammatically the theory underlying this invention.

FIG. 3 is a view similar to FIG. 1 illustrating one embodiment of this invention.

FIG. 4 is a plan view of the FIG. 2 form of the invention.

When an electric field is applied to the electrodes 1 and 2 attached to the X-axis faces 11 and 12 of a piezoelectric crystal 10, such as shown in FIG. 1A, there is a compression along the X-axis that begins at the faces and these compressional waves progress inwardly at a velocity in accordance with the velocity constant of the material. This is equivalent to a mechanical stress applied to both faces with the resultant strains progressing inwardly and when the wave fronts pass the mid-point of the X-axis, the crystal lattice is dilated rather than compressed, and when the wave fronts arrive at the opposite faces, the crystal is dilated along the X-axis, as shown in FIG. 1B. The repeated internal reverberation of these internal stress/strain waves generate the long acoustic wave trains, generally referred to as "Ring," and are responsible for the low resolution of these transducers, both for detecting and generating acoustic waves.

These face displacements of the crystal generate two acoustic waves, one at each face, and each of these waves divides into two parts, if the faces are coupled to acoustic loads, one from each face propagating into the crystal and the other from each face propagating into the face loading medium: the test specimen 15 for one face and the damping material 14 for the other, or opposite, face. These waves are labeled A, B, C and D in FIG. 2.

If a slot, such as 20 in FIG. 2, whose depth is exactly one-half the thickness along the X-axis, is cut into the crystal 10, wave B will be reflected back from the bottom of the slot 20 and will return to the surface 11 of the crystal 10 coincident with the arrival of wave C, but these waves will be 180° out of phase and the displacement of face 11 will be proportional to the algebraic sum of the two waves. The time of arrival of these two waves corresponds to the start of the second half cycle of the wave train radiated from face 11.

If a plurality of slots, such as shown in FIG. 3, are cut into the crystal, and the total area of the bottoms of the slots is made equal to the total area of the pedestals 21, the two waves, C and the slot reflected portion of wave B will be equal in magnitude and opposite in phase and the net displacement of the face 11 will be essentially zero at this time. The degree of cancellation is a function of the acoustic impedance ratio of the face 11 and pedestal 21 load impedances. If the ratio is unity, the magnitude of the waves will be equal and the cancellation complete. It has been found that reasonable departures from unity ratio may be tolerated and yield a high degree of cancellation. To provide maximum cancellation, and therefore highest resolution, it has been found not only desirable to have unity ratio of face and pedestal load impedances but to have equal widths for the slots and pedestals and a dimension equal to one or two wavelengths at the fundamental thickness mode frequency of the crystal. The exact pattern of these slots and pedestals is not critical as, for example, they could be concentric circles in a round crystal, as long as the slot width, depth and spacing is maintained.

When a crystal transducer, such as described and illustrated in FIG. 3, is used as a detector, that is to convert acoustical into electrical waves, the effective internal damping is also high, making the transducer a high resolution detector operating in the following manner. When an acoustic echo, such as would be reflected from the laminar flaw 25 of FIG. 3, arrives at the face 11 of the crystal 10, there is a displacement of the ionic lattice of the crystal 10 which alters the electrostatic charge between the electrodes attached to the crystal face 11 and the tops of the pedestals 21. The free electrons on the electrodes are transferred between the electrodes under the influence of the ionic field, and this electron flow through a load resistor connected between the electrodes produces the electrical signal. The wave front propagates towards the opposite face of the crystal, part being reflected from the bottom of the slots 20 and part continuing toward the top of the pedestals 21. The portion of the wave reflected from the bottom of the slots arrives back at the entrant surface, face 11, coincident with the arrival of the wave front at the top of the pedestals 21. These two waves produce opposite displacements of the crystal lattice and therefore opposite polarity fields. The net charge between the electrodes is zero and there is no electron flow. In this manner, the voltages generated by the internal reflections of the acoustical energy are made to cancel each other. However, should a second echo arrive while the internal reflections of the preceding echo are in progress, a voltage proportional to the amplitude of the second echo will be generated exactly as was obtained from the first echo.

Having described my invention, what I claim and desire to secure by Letters Patent is:

1. A high resolution ultrasonic transducer comprising a piezoelectric element including parallel surfaces substantially normal to a selected axis, a first of said surfaces being adapted to be acoustically coupled to a workpiece and a second of said surfaces having one portion spaced a given distance from said first surface in the direction of said axis and another portion spaced a distance substantially equal to one-half said given distance from said first surface in the direction of said axis, and electrode means coextensive with at least a portion of said first surface and of said one portion of said second surface and electrically coupled thereto.

2. A high resolution ultrasonic transducer as specified in claim 1 in which the total area of said one portion of said second surface transmits the same quantity of energy toward said first surface as the total area of said other portion reflects toward said first surface.

3. A high resolution ultrasonic transducer as specified in claim 1 in which the total area of said first portion of said second surface is substantially equal to the total area of said other portion of said second surface.

4. A high resolution ultrasonic transducer as specified in claim 1 comprising a plurality of pedestals and intervening slots, the tops of said pedestals defining said one portion of said second surface and the bottoms of said slots defining said other portion of said second surface.

5. A high resolution ultrasonic transducer as specified in claim 4 in which the total area of the tops of said pedestals transmits the same quantity of energy toward said first surface as the total area of the bottoms of said slots reflects toward said first surface.

6. A high resolution ultrasonic transducer as specified in claim 4 in which the total area of the tops of said pedestals is substantially equal to the total area of the bottoms of said slots.

References Cited in the file of this patent

UNITED STATES PATENTS

| | | |
|---|---|---|
| 2,416,314 | Harrison | Feb. 25, 1947 |
| 2,484,626 | Keller | Oct. 11, 1949 |
| 2,543,500 | Kettering | Feb. 27, 1951 |
| 2,716,708 | Bradfield | Aug. 30, 1955 |

OTHER REFERENCES

Cady: "Piezoelectricity," McGraw-Hill Book Co., New York, 1946, p. 241, sec. 182.